(No Model.) 3 Sheets—Sheet 1.
W. S. MORDEN & R. HOFFMAN.
CORN CUTTER.
No. 439,969. Patented Nov. 4, 1890.
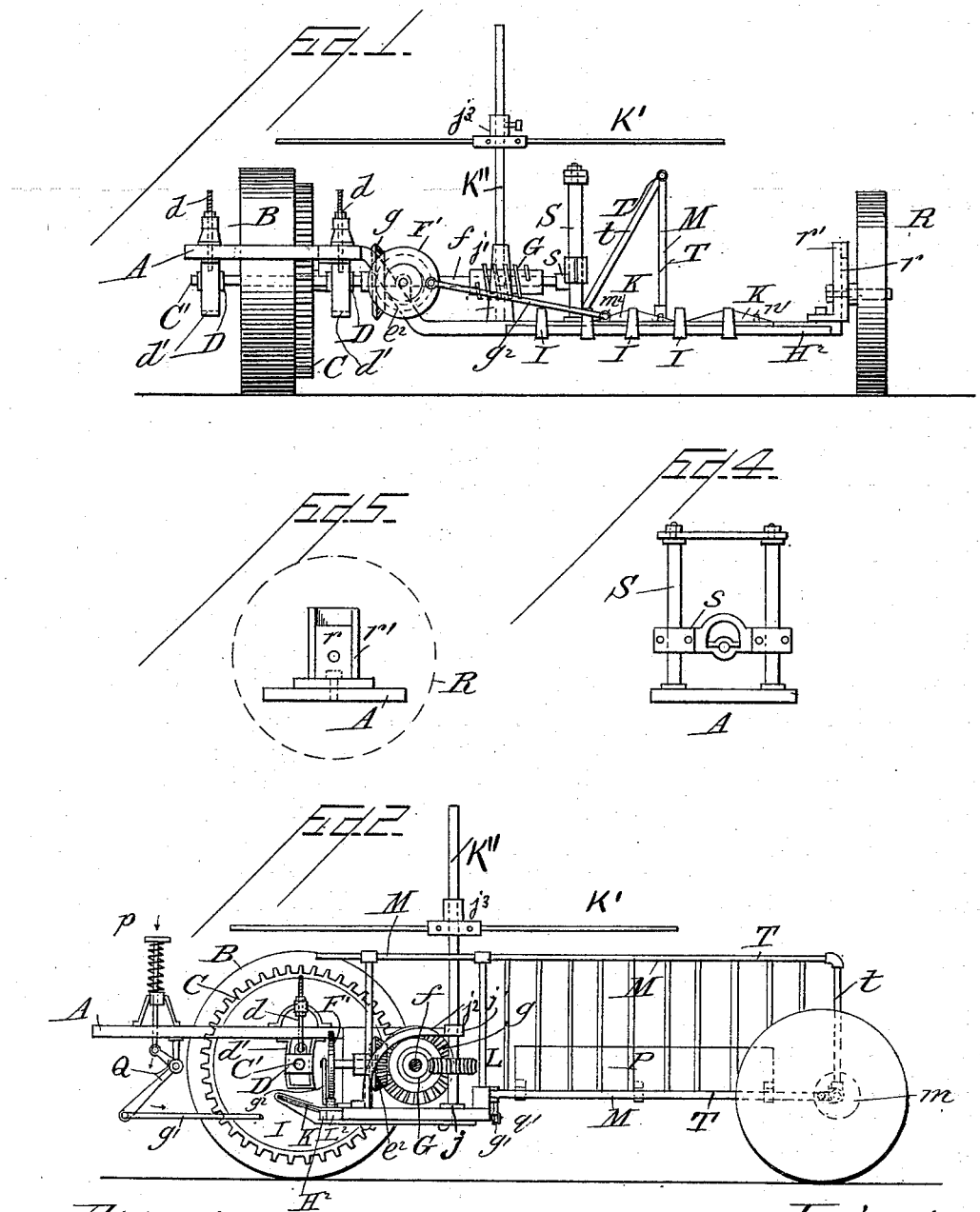

(No Model.) 3 Sheets—Sheet 2.
W. S. MORDEN & R. HOFFMAN.
CORN CUTTER.
No. 439,969. Patented Nov. 4, 1890.
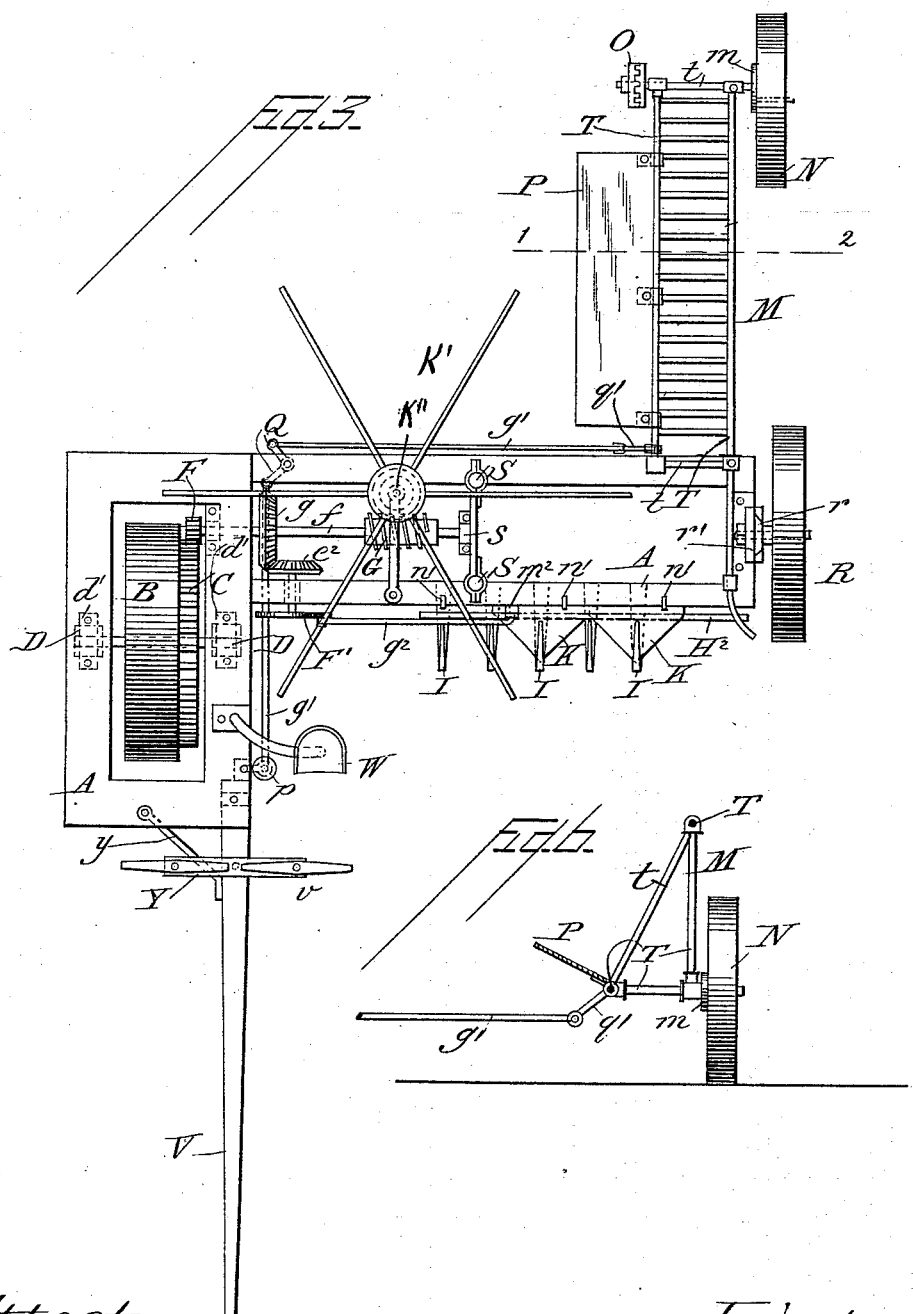
Attest
F. H. Schott
Fred E. Tasker.
Inventors
William S. Morden,
Ralph Hoffman,
by John E. Tasker atty.

(No Model.) 3 Sheets—Sheet 3.
W. S. MORDEN & R. HOFFMAN.
CORN CUTTER.
No. 439,969. Patented Nov. 4, 1890.
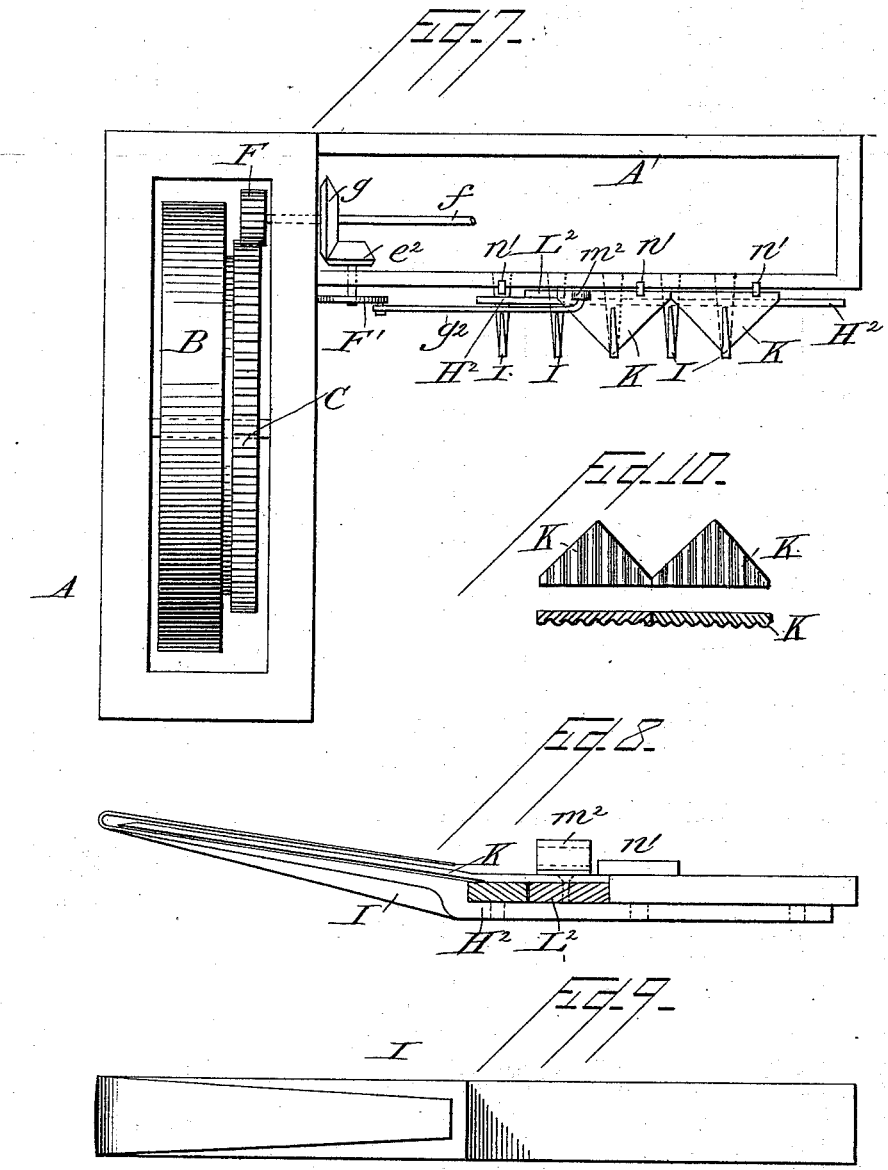
Witnesses
F. H. Schott
Fred E. Tasker
Inventor
William S. Morden,
Ralph Hoffman,
John C. Tasker Attorney

UNITED STATES PATENT OFFICE.

WILLIAM SCOTT MORDEN AND RALPH HOFFMAN, OF MONTAGUE, MICHIGAN.

CORN-CUTTER.

SPECIFICATION forming part of Letters Patent No. 439,969, dated November 4, 1890.

Application filed April 24, 1890. Serial No. 349,282. (No model.)

*To all whom it may concern:*

Be it known that we, WILLIAM SCOTT MORDEN and RALPH HOFFMAN, citizens of the United States, residing at Montague, in the county of Muskegon and State of Michigan, have invented certain new and useful Improvements in Corn-Cutters; and we do hereby declare the following to be a full, clear, and exact description of the invention, such as will enable others skilled in the art to which it appertains to make and use the same.

This invention relates to an improvement in that class of machinery used for cutting corn, ensilage, cane, or other cereals and grain while they are growing in the field, the object being to substitute mechanical for manual labor and to provide a machine whereby the corn or other field product may be effectually cut and deposited on a dumping-support until a bundle thereof of sufficient size has been formed to be transferred by the operator to the ground, thus saving the large amount of physical labor which commonly attends the cutting of the corn by hand, besides hastening work and assisting in manifold ways.

The invention consists in a locomotive-machine adapted to be propelled over the fields by a horse or other power. This machine derives its motion from one or more drive-wheels The invention consists, essentially, in certain peculiarities in the construction, arrangement, and combination of parts, substantially as will be hereinafter described, and then more particularly pointed out in the appended claims.

In the accompanying drawings, illustrating our invention, Figure 1 is a front elevation of the machine. Fig. 2 is a side elevation with certain parts removed. Fig. 3 is a plan view of the entire machine. Fig. 4 is a detail view of the standards and brackets for journaling the ends of the shafts. Fig. 5 is an elevation of the movable slide. Fig. 6 is a cross-sectional elevation on line 1 2 of the trough. Fig. 7 is a plan view showing the reciprocating knives or cutters in detail, together with the guards. Fig. 8 is a sectional side elevation of the same. Fig. 9 is a detail view of one of the guards. Fig. 10 is a bottom plan view of the cutters, showing the corrugated form.

Like letters of reference designate like parts throughout all the different figures of the drawings.

A denotes the main frame of the machine, which is preferably made of light iron-casting, but can be made of gas-pipe or hard wood, if preferred. It is preferably of the general form shown in Figs. 1 and 3, although it may be of any convenient form to permit the proper arrangement therein and therewith of the several mechanical parts of the machine.

The frame of this machine is such, as will be seen by inspecting Fig. 1, as to enable the cutters to reach close to the surface of the soil.

B designates the main driving-wheel, which travels upon the surface of the field and serves to propel the machine, and also to transmit power to drive the mechanism of which the machine is composed. Secured to one side of the drive-wheel B is the gear-wheel C. The wheel B and its connected gear are firmly fastened upon the shaft C', which is journaled in the movable slide-boxes D D. These slide-boxes are carried in the slides $d'$ $d'$, which are firmly fastened to the main frame A.

To the upper portion of the boxes D are pivoted the bolts $d$ $d$, which pass through the curved standards fastened on the upper side of frame A, said bolts being furnished with nuts above and below the base of the standards for the purpose of holding the bolts in any desired position of adjustment. By adjusting these bolts the slide-boxes can be located in different positions, and consequently the drive-wheel B and its shaft may have their positions changed relatively to the frame, as may be desired. These slides $d'$ $d'$ have a curvature with a radius equal to the radius between the center of the driving-wheel and the pinion F. This pinion is secured to the shaft $f$ and engages the gear-wheel C, by which it is driven, said shaft $f$ being properly journaled in boxes fastened in the frame. On this shaft $f$ is also a worm G, and it also carries a bevel gear-wheel $g$.

The cutting devices in this machine consist, essentially, of two large reciprocating knifes K. (See Figs. 7 and 8.) The bevel-pinion $g$ engages another bevel-pinion $e^2$, located on a shaft at right angles to the shaft that carries the gear $g$. The outer end of this latter shaft carries a crank-wheel F', to which is pivotally connected the connecting-rod $g^2$. To the under side of the main frame A of the machine is securely fastened a series of guards I I I I. (See Figs. 7 and 8 and the detailed view of Fig. 9.) These guards extend outward beyond the point of the knives and are then returned back over the top of the knife as far as the inside of the V-shaped or cutting edge. The cutting-knives are riveted to the slide $L^2$, and are kept in place by means of the bar $H^2$, which is riveted on the upper face of the guards I. There are also projections or pieces fastened on the main frame—as, for instance, at the points $n'$ $n'$—which project a little over the rear end of the knife-blades. These keep the knives down to the face of the guard and prevent them from lifting out of place while they are in operation during the practical working of the machine. The connecting-rod $g^2$ is journaled in the projection $m^2$, which is fastened upon the upper face of the knives. By observing the side view of Fig. 8 we shall see the position of the guards and the location of the knife as it travels through the looped portions of said guards. When the machine is in operation, the stock to be cut passes between the said guards I. The knives are then moved from the position shown in the drawings to a corresponding position on the opposite side of their path of movement, and the stock is therefore cut between the knives and guards. This constant reciprocation of the knives, which is similar to the motion of the knives in an ordinary mowing-machine, accomplishes the cutting of the stock thoroughly and effectually. It will be particularly observed that the knives and guards project upward in an incline. This is for the purpose of causing the stock to be crowded toward the frame of the machine. These guards, it may, moreover, be mentioned, are narrow near the point after they have been bent over on the top of the knives. Furthermore, the knives should be large and strong to enable them to accomplish the work for which they are intended.

In the rear portion of the machine is an elongated rectangular frame-work M, made preferably of pipe and securely fastened to castings, which are bolted to the main frame. In the extreme end of the frame is a shaft provided with a disk $m$, on which disk is fastened the pin for carrying the rear wheel N. The distance from the center of this disk $m$ to the center of the pin is equal to half the height to which the main frame can be raised or lowered. The opposite end of this shaft is provided with a clutch O, (see Fig. 3,) one half of which is loose and fits on a square part of the shaft, while the other half is formed with a part of the frame. When the wheel N is to be raised or lowered, the clutch is disengaged, the wheel properly adjusted, and the loose half of the clutch is then inserted into the solid part and held in place by a nut on the end of said shaft. On this frame is arranged the leaf or board P, which is hinged to the frame behind the cutter. When the stock is cut, it will be carried by the machine until a bundle of sufficient size is obtained, when the operator by the action of his foot will depress the treadle $p$, located near the forward end of the machine, and by an arrangement of right-angled levers Q and connecting-rods $g'$, which connect with the lever $q'$, that forms a part of the aforesaid trough, said leaf P will be lowered into nearly a perpendicular position, and a bundle of corn consequently deposited upon the ground.

R denotes one of the wheels of the machine, located opposite to the driving-wheel B. The carrying-pin of this wheel is fastened to a sliding block $r$ for the purpose of raising and lowering this wheel, said sliding block being carried in a casting $r'$, which is fastened to the frame, and is secured in position thereto by means of a nut on the back of the casting. (See Fig. 5.)

S, Fig. 4, indicates an arrangement of standards fastened to the frame, to which is secured the bracket $s$, which carries the end of the horizontal shaft. The plan view of this arrangement shows more clearly in Fig. 3.

T is a system of upright and horizontal pipes, forming part of the frame M and carried at any desired height so as to act as a guard for the stock while being carried to the trough.

$t$ denotes two inclined pipes connected to the upper longitudinal pipe T on the upper end and to the lower longitudinal pipe T of the frame M. This pipe acts as a brace and supports the outer end of the frame M, and the space between the two pipes on the angle will preferably be filled in with short irons, so as to enable the stock after being cut to slide easily down into the trough.

W, Fig. 3, represents the seat for the driver, and V the tongue, $v$ the whiffletree, and Y the evener.

$y$ is a brace to fasten the tongue to the frame.

The cutting-knives are sickle-knives, and are corrugated on the under side.

K'' denotes an upright shaft having its lower end journaled in a box $j$ on the frame A, which box forms a cup-bearing for the shaft. The shaft is journaled above in a bearing $j'$ on the end of the bracket $j^2$, which is fastened to the frame A and straddles the worm G, as shown. Above the bracket this shaft is preferably made square. It extends upward the desired height to permit the arms to operate so as to suit the longest stock to be cut. On this square shaft is a loose hub $j^3$, in which is fastened a series of arms K', preferably six in number, although there may be any number of them. The hub is adjustable upon the shaft, and may be held at any desired height by means of the set-screw with which it is provided. Motion is communicated to this shaft by the worm-wheel L, (see Fig. 2,) secured thereon and engaging with the worm on the main driving-shaft $f$. In this way we secure a slow motion of the arms while the knives revolve at a rapid speed.

Having thus described our invention, what we claim as new, and desire to secure by Letters Patent, is—

1. The combination of the main frame A, the main driving-wheel B on shaft C', which is journaled in the movable slide-boxes D D, carried in the slots $d'$ $d'$, firmly fastened to frame A, the bolts $d$ $d$, pivoted to the upper portions of the boxes D and passing through the curved standards fastened on the upper side of the frame A, said bolts being furnished with nuts above and below the base of the standards to hold them in any desired position of adjustment, the shaft $f$, carrying pinion F, engaging the gear-wheel C, secured to one side of the drive-wheel B, said shaft $f$ carrying also a bevel-gear $g$, the shaft carrying bevel-pinion $e^2$, engaging pinion $g$, and carrying also crank-wheel F', the connecting-rod $g^2$, pivoted to said crank-wheel, the reciprocating knives K K, and the series of guards I I, all arranged substantially as described.

2. The combination of the main frame A, the drive-wheels B, having secured to one side thereof the gear-wheel C, both being fixed upon the shaft C', journaled in the slide-boxes D D, carried in the slides $d'$ $d'$, which are firmly fastened to the frame A, said boxes having pivoted thereto the adjustable bolts $d$ $d$, passing through the curved standard on the upper side of the frame, wheel R, having its carrying-pin fastened to the sliding block $r$, carried in the casting $r'$, the shaft $f$, carrying pinion F, engaging gear C, and carrying also bevel-gear $g$, the cutting-knives K K, the shaft carrying pinion $e^2$, engaging pinion $g$, and carrying also crank-wheel F', the connecting-rod $g^2$, pivoted to said crank-wheel, the series of guards I I, the slide $L^2$, to which the cutting-knives are riveted, together with the bar $H^2$, for keeping them in place, and the projection $m^2$, in which the connecting-rod is journaled, all substantially as described.

In testimony whereof we affix our signatures in presence of two witnesses.

WILLIAM SCOTT MORDEN.
RALPH HOFFMAN.

Witnesses:
ROBERT WEIR,
D. J. MORIARTY.